US009390564B2

(12) United States Patent
Gilham et al.

(10) Patent No.: US 9,390,564 B2
(45) Date of Patent: Jul. 12, 2016

(54) METHOD FOR PROCESSING ADDRESSES AT A VERY FAST RATE

(71) Applicant: NEOPOST TECHNOLOGIES, Bagneux (FR)

(72) Inventors: Dennis Thomas Gilham, Essex (GB); Ruben Rico, Paris (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 0 days.

(21) Appl. No.: 14/306,629

(22) Filed: Jun. 17, 2014

(65) Prior Publication Data

US 2014/0297566 A1 Oct. 2, 2014

Related U.S. Application Data

(62) Division of application No. 12/018,479, filed on Jan. 23, 2008.

(30) Foreign Application Priority Data

Jan. 26, 2007 (FR) ..................................... 07 52904

(51) Int. Cl.
*G06F 7/00* (2006.01)
*G07B 17/00* (2006.01)
*G06Q 50/32* (2012.01)

(52) U.S. Cl.
CPC ................ *G07B 17/00* (2013.01); *G06Q 50/32* (2013.01); *G07B 17/00467* (2013.01); *G07B 17/00508* (2013.01); *G07B 17/00661* (2013.01); *G07B 2017/00475* (2013.01); *G07B 2017/00709* (2013.01)

(58) Field of Classification Search
USPC .......................................................... 700/224
See application file for complete search history.

(56) References Cited

U.S. PATENT DOCUMENTS

| | | | | |
|---|---|---|---|---|
| 4,934,846 | A | 6/1990 | Gilham | |
| 6,740,836 | B2 | 5/2004 | Ryan et al. | |
| 6,977,353 | B1 | 12/2005 | Avant et al. | |
| 7,118,034 | B2 | 10/2006 | Baldassari et al. | |
| 7,304,261 | B2 | 12/2007 | Avant et al. | |
| 7,397,009 | B2 | 7/2008 | O'Donohue et al. | |
| 7,576,842 | B2 | 8/2009 | Park | |
| 2001/0042120 | A1* | 11/2001 | Deslandes et al. | 709/224 |
| 2002/0077991 | A1 | 6/2002 | Heimann et al. | |

(Continued)

FOREIGN PATENT DOCUMENTS

| | | | |
|---|---|---|---|
| WO | 0000300 | A1 | 1/2000 |
| WO | 0008612 | A1 | 2/2000 |
| WO | 0065541 | A1 | 11/2000 |

*Primary Examiner* — Kyle Logan
(74) *Attorney, Agent, or Firm* — Seed IP Law Group PLLC

(57) ABSTRACT

A mail processing method for franking mail items, which franking machine is connected to a first server that is itself connected to a second server in communication with a sorting machine, the franking method including scanning the destination addresses borne on the mail items as the mail items are inserted, storing the digital images of the addresses scanned in this way, in association with respective unique identification numbers, and periodically transferring the digital images as indexed in this way to a first server. The first or second server extracts determined data from the digital images, which data, associated with the unique identification numbers, is suitable for enabling the sorting machine to be controlled automatically on receiving the franked mail items.

12 Claims, 2 Drawing Sheets

(56) References Cited

U.S. PATENT DOCUMENTS

| | | | | |
|---|---|---|---|---|
| 2003/0110145 | A1* | 6/2003 | Sansone | 705/406 |
| 2003/0167241 | A1* | 9/2003 | Gilham | 705/405 |
| 2004/0004119 | A1 | 1/2004 | Baldassari et al. | |
| 2005/0069366 | A1 | 3/2005 | Gunther | |
| 2005/0171869 | A1* | 8/2005 | Minnocci | 705/28 |
| 2006/0268259 | A1 | 11/2006 | Park | |
| 2007/0239313 | A1* | 10/2007 | Goyal et al. | 700/224 |
| 2008/0208390 | A1 | 8/2008 | Rundle | |
| 2009/0106039 | A1 | 4/2009 | Chatte | |

* cited by examiner

METHOD FOR PROCESSING ADDRESSES AT A VERY FAST RATE

CROSS-REFERENCE TO RELATED APPLICATIONS

This application is a Divisional of U.S. application Ser. No. 12/018,479 filed Jan. 23, 2008, in the U.S. Patent and Trademark Office, which claims priority from French Patent Application No. 0752904, filed on Jan. 26, 2007, the disclosures of which are incorporated herein by reference in their entireties.

FIELD OF THE INVENTION

The present invention relates to the field of processing documents, and it relates more particularly to a system for processing addresses making it possible to sort mail items at a very fast rate.

PRIOR ART

In order to avoid bottlenecks while processing mail for delivery, the mail items should preferably be sorted at a fast rate. One known way of accelerating sorting is to print specific codes, in general bar codes, on the envelopes to be sorted, which codes, by forming automatically-readable graphic representations of the post code or "ZIP code" of each destination, make it possible to accelerate sorting.

Unfortunately, that solution is not universal, and, since not all mail items have such codes, it is necessary to perform destination address recognition at the inlet of the sorting machine in order for the sorting to be performed correctly. Since such recognition is complex, it takes time, which results in the mail delivery process being slowed down significantly.

OBJECT AND DEFINITION OF THE INVENTION

An object of the present invention is thus to provide a mail processing system that makes it possible to achieve a sorting rate that is particularly fast for franked mail items, i.e. for mail items that bear postage values.

This object is achieved by a mail processing system including a franking machine for franking mail items, which franking machine is disposed in a sender's mail room and is connected remotely to a first server that is itself connected to a second server, said second server being in communication with a sorting machine for sorting franked mail items received at an office for receiving said mail items, wherein said franking machine includes scanner means for scanning the destination addresses borne on the mail items as said mail items are inserted into said franking machine, storage means for storing the digital images of the addresses scanned in this way, in association with respective unique identification numbers, and communications means for periodically transferring the digital images as indexed in this way to said first server, and wherein means are provided for extracting determined data from said digital images, which data, associated with said unique identification numbers, is suitable for enabling said sorting machine to be controlled automatically on receiving said franked mail items.

Thus, with this particular configuration that makes it possible to scan the mail items as they are being sent, and thus to recognize the addresses of the destinations before the mail items enter the sorting machine, the mail items can be sorted very rapidly and economically, and delivering their respective mail items to the destinations can be planned.

Preferably, said first server is a server of the dealer of said franking machine and said second server is a server of the postal authorities or of a private carrier who handles mail delivery, and said means for extracting determined data from said digital images are disposed in one or the other of said first and second servers.

Advantageously, said determined data comprises at least a destination post code, and said first server further includes means for verifying said destination post code on the basis of a database of valid addresses.

Depending on the embodiment, said unique identification number may be printed on the mail item at the same time as the postal imprint is printed thereon, or else said unique identification number may be read from the mail item at the same time as the address of the destination is read therefrom, or indeed said unique identification number may be extracted from a Radio-Frequency Identification (RFID) transponder stuck to the mail item or from a three-dimensional "fingerprint" of the paper forming the mail item.

Preferably, said unique identification number as printed or read is a bar code or an alphanumeric code.

The invention also provides a method of automatically controlling the sorting machine, said method comprising the following steps: reading said unique identification numbers on receiving said franked mail items, retrieving said determined data associated with said unique identification numbers as read, and automatically controlling said sorting machine as a function of said determined data as retrieved.

BRIEF DESCRIPTION OF THE DRAWINGS

The characteristics and advantages of the present invention appear more clearly from the following description given by way of non-limiting indication and with reference to the accompanying drawings, in which.

DETAILED DESCRIPTION OF A PREFERRED EMBODIMENT

Figure 1:
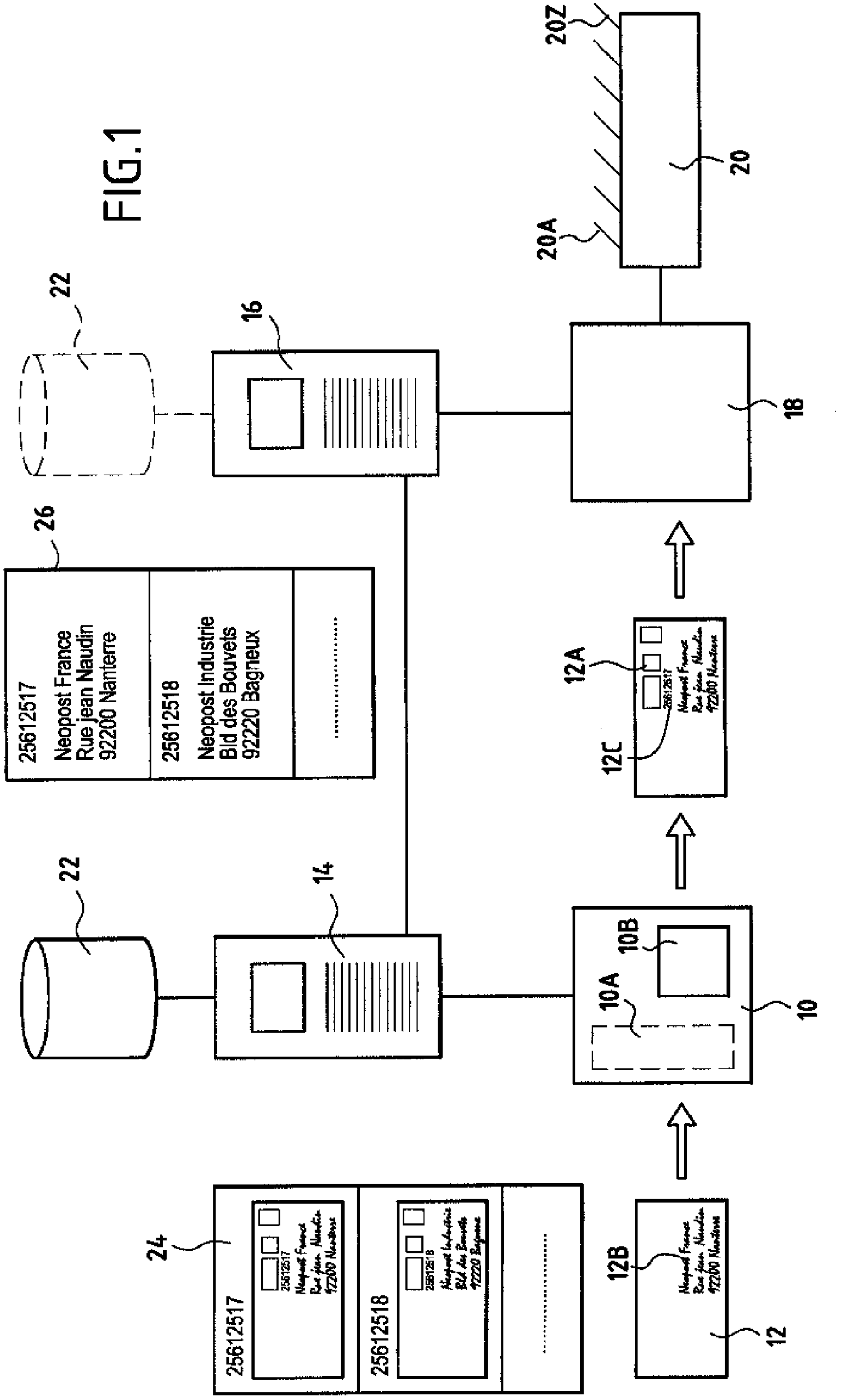
FIG. 1 is a simplified diagrammatic view of a mail processing system that makes it possible for accelerated sorting to be implemented in accordance with the invention.

FIG. 1 diagrammatically shows a mail processing system including, as is known, a franking machine or "postage meter" 10 that is disposed in a sender's mail room, that is designed to print a postal imprint 12A on the mail items 12 that it receives, e.g. from a mail item feed system (not shown), and that is connected remotely to a server 14 of a dealer of the franking machine, which server is itself connected to a server 16 of the postal authorities. At an office of the postal authorities for receiving the mail items, the second server is in communication with a document optical reader 18 whose outlet is connected to a sorting machine 20 having a plurality of mail item receiving trays 20A to 20ZA, each of which corresponds to a particular destination for the mail items. The optical reader receives the franked mail items and extracts therefrom various information necessary for sorting said mail items, e.g. bar codes when the mail item is provided with such a bar code.

In accordance with the invention, the franking machine 10 includes an optical reader 10A, advantageously of the scanner type provided with a contact sensor for scanning the destination address 12B borne on the mail item, and storage means 10B of the database type for storing the image of the address scanned in this way. Said image is associated in the database with a unique identification code 12C that is printed on the mail item by the franking machine while the postal imprint is being printed. Alternatively, said unique code can also already be present on the mail item, preferably in the address, and it is then scanned with said address. Similarly, the dealer's server is connected to an address database 22 containing an up-to-date list of valid addresses.

Figure 2:
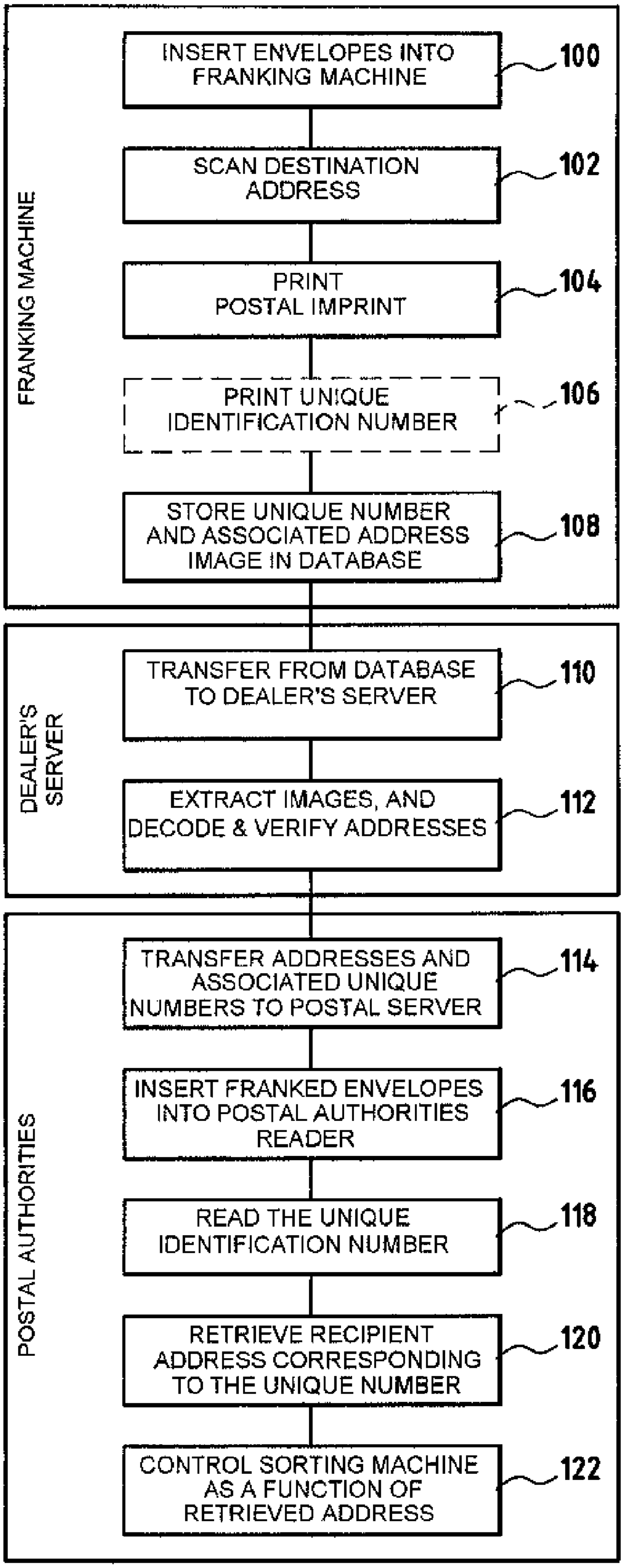
FIG. 2 is a flow chart showing an example of the processing method implemented in the FIG. 1 system.

Operation of the system is described below in association with FIG. 2. In a first step 100, the envelopes or labels to be franked are inserted stack-by-stack into the franking machine in which, during a step 102, the destination addresses borne on the envelopes are scanned one-by-one by the scanner means 10A. In the next step 104, the postal imprint is printed on the envelope as is the unique identification code (step 106) when said code is not already present on the envelope. In step 108, the unique identification number is stored in the database 10B of the franking machine together with the digital image of the address corresponding to the envelope bearing said number. Periodically, and at the latest while the mail is being collected, the contents of said database (two records of which are shown by reference 24) are, in another step 110, sent automatically for processing to the dealer's server 14 via known communications means (not shown). In a step 112, this processing consists in implementing an optical character recognition (OCR) process to extract from each of the received digital images the destination address (optionally limited merely to the post code) of the envelope in question, to recognize it (decoding it by character recognition), and to verify the validity of said address (in particular that the post code does really exist) by means of the address database 22 associated with the dealer's server. Once this operation has been performed, the verified address and the associated unique identification number are sent, in a step 114, to the postal authorities' server 16, or are merely made available to that server so as to accelerate the sorting operations, and, correspondingly, so as to plan in advance the logistics of delivering the mail to its destination. Two records of the database that are accessible in this way are shown by reference 26.

On inserting the envelopes into the optical reader 18 in a step 116, it is possible, merely by reading the unique identification number (step 118), for the exact destination address (i.e. the address after any correction) to be retrieved automatically, in a step 120, without any prior character recognition at said reader, and, on the basis of that address, it is possible, in a final step 122, to control the sorting machine as a function of the address retrieved in this way. Naturally, the mail items that have not been subjected to the above-mentioned processing, i.e. essentially those mail items that are mailed in mailboxes, undergo different processing that implements, as is known, a video coding center with the post code being input manually after the mail items have been directed to a specific reject tray of the sorting machine.

It should be noted that, although in the above-mentioned description, the sorting is performed by the postal authorities, the invention may naturally be used by a private carrier providing a mail delivery service and whose server is then in communication with the dealer's server. Similarly, the contents of the database that are accessible by the postal authorities or by the private carrier are not limited to the above-mentioned records, but rather they may, for example, also include the image of the destination address or indeed a code corresponding directly to one of the mail item receiving trays of the sorting machine.

It should also be noted that, although in the example shown, operations are performed to extract the images, to decode them, and to verify them at the dealer's server, it should be understood that those operations can just as well be performed at the postal authorities' server (provided that the valid address database 22 is connected to it) as soon as the dealer's server receives the corresponding data, and thus above all well before the mail items are scanned at the mail-receiving office of the postal authorities.

It is also clear that, although reference is made above to a franking machine that incorporates scanner means, it is also possible to provide external scanner means, in particular when it is necessary to scan addresses borne on thick envelopes or parcels. Said scanner means may also incorporate RFID read means when the mail item is provided with a RFID transponder in which the unique identification number is written, or indeed a scanner for scanning the three-dimensional structure of the paper, of the type developed by Ingénia® when said unique identification number is constituted merely by the 3D "fingerprint" of the paper forming the mail item.

What is claimed is:

1. A method of automatically controlling a sorting machine disposed at an office for receiving and sorting franked mail items said method comprising the following steps:

at a sender's mail room:

scanning the destination addresses borne on the mail items as said mail items are inserted into a franking machine for franking mail items;

storing digital images of the scanned destination addresses, in association with respective unique identification numbers, said digital images of the scanned destination addresses being periodically transferred to a first server; and franking the mail items and printing the respective unique identification numbers on the mail items at the same time, and at said office for receiving and sorting franked mail items:

only reading said unique identification numbers on the received franked mail items without capturing or processing the images of the franked mail items and without printing any unique identification numbers on the received franked mail items;

retrieving from said first server, or from a second server remotely connected to said first server, determined data associated with said unique identification numbers as read and configured for enabling at said office for receiving said franked mail items said sorting machine to be controlled automatically on receiving said franked mail items; and automatically controlling said sorting machine with said determined data as retrieved.

2. The method for automatically controlling a sorting machine according to claim 1, wherein said first server is a server of a dealer of said franking machine.

3. The method for automatically controlling a sorting machine according to claim 2, wherein said second server is a server of a postal authority or of a private carrier who handles mail delivery.

4. The method for automatically controlling a sorting machine according to claim 1, wherein said determined data comprises a destination post code.

5. The method for automatically controlling a sorting machine according to claim 4, wherein said first server further comprises means for verifying said destination post code on the basis of a database of valid addresses.

6. The method for automatically controlling a sorting machine according to claim 5, wherein said unique identification number as printed is a bar code or an alphanumeric code.

7. A method of automatically controlling a sorting machine disposed at an office for receiving and sorting franked mail items said method comprising:

at said office for receiving and sorting franked mail items:

only reading respective unique identification numbers on the received franked mail items without capturing or processing images of the franked mail items and without printing any unique identification numbers on the received franked mail items;

retrieving from a first server, or from a second server remotely connected to said first server, determined data associated with said unique identification numbers and configured for enabling at said office for receiving said franked mail items said sorting machine to be controlled automatically on receiving said franked mail items; and automatically controlling said sorting machine with said determined data as retrieved, wherein at a sender's mail room:

the destination addresses borne on the mail items were scanned as said mail items were inserted into a franking machine for franking mail items, digital images of the scanned destination addresses, in association with the respective unique identification numbers, were transferred to the first server, and the mail items were franked and the respective unique identification numbers were printed on the mail items.

8. The method for automatically controlling a sorting machine according to claim 7, wherein said first server is a server of a dealer of said franking machine.

9. The method for automatically controlling a sorting machine according to claim 8, wherein said second server is a server of a postal authority or of a private carrier who handles mail delivery.

10. The method for automatically controlling a sorting machine according to claim 7, wherein said determined data comprises a destination post code.

11. The method for automatically controlling a sorting machine according to claim 10, wherein said first server further comprises means for verifying said destination post code on the basis of a database of valid addresses.

12. The method for automatically controlling a sorting machine according to claim 11, wherein said unique identification number as printed is a bar code or an alphanumeric code.

* * * * *